United States Patent

Hagen et al.

[11] Patent Number: 6,080,315
[45] Date of Patent: Jun. 27, 2000

[54] PROCESS FOR THE PARTIAL DESALINATION OF WATER

[75] Inventors: Klaus Hagen; Uwe Sauer, both of Kulmbach; Hans-Dieter Schmid; Peter Schultheiss, both of Mainleus; Werner Sauerschell, Kasendorf; Wolfgang Höll, Ettlingen; Astrid Stepanek, Böblingen, all of Germany

[73] Assignees: WABAG Wassertechnische Anlagen GmbH, Kulmbach; Forschungszentrum Karlsruhe, Karlsruhe, both of Germany

[21] Appl. No.: 09/231,434

[22] Filed: Jan. 14, 1999

[30] Foreign Application Priority Data

Jan. 15, 1998 [DE] Germany .............. 198 01 174

[51] Int. Cl.[7] ...................................... C02F 1/42
[52] U.S. Cl. ................ 210/638; 210/673; 210/677; 210/686; 210/694
[58] Field of Search .................. 210/638, 673, 210/677, 686, 687, 694; 521/26

[56] References Cited

U.S. PATENT DOCUMENTS

| 3,420,709 | 1/1969 | Barrett et al. | 210/503 |
| 3,639,231 | 2/1972 | Bresler | 210/638 |
| 4,172,185 | 10/1979 | Petheram | 521/26 |
| 4,448,693 | 5/1984 | Kiehling et al. | 210/673 |

*Primary Examiner*—Ivars Cintins
*Attorney, Agent, or Firm*—Max Fogiel

[57] ABSTRACT

In a process for the partial desalination of water, especially of drinking water, with a mixture of weakly acid cation exchangers and strongly basic anion exchangers, whereby the charged ion exchangers are regenerated by $CO_2$-containing water, if required, with the addition of $CaCO_3$, $CaCO_3/MgO$, $Ca(OH)_2$ or the like. Simultaneous with the partial desalination, the organic carbon compounds present in the water are reduced, whereby the charged ion exchangers are intermittently regenerated with HCl, NaCl, NaOH, or a mixture of NaCl and NaOH.

9 Claims, 1 Drawing Sheet

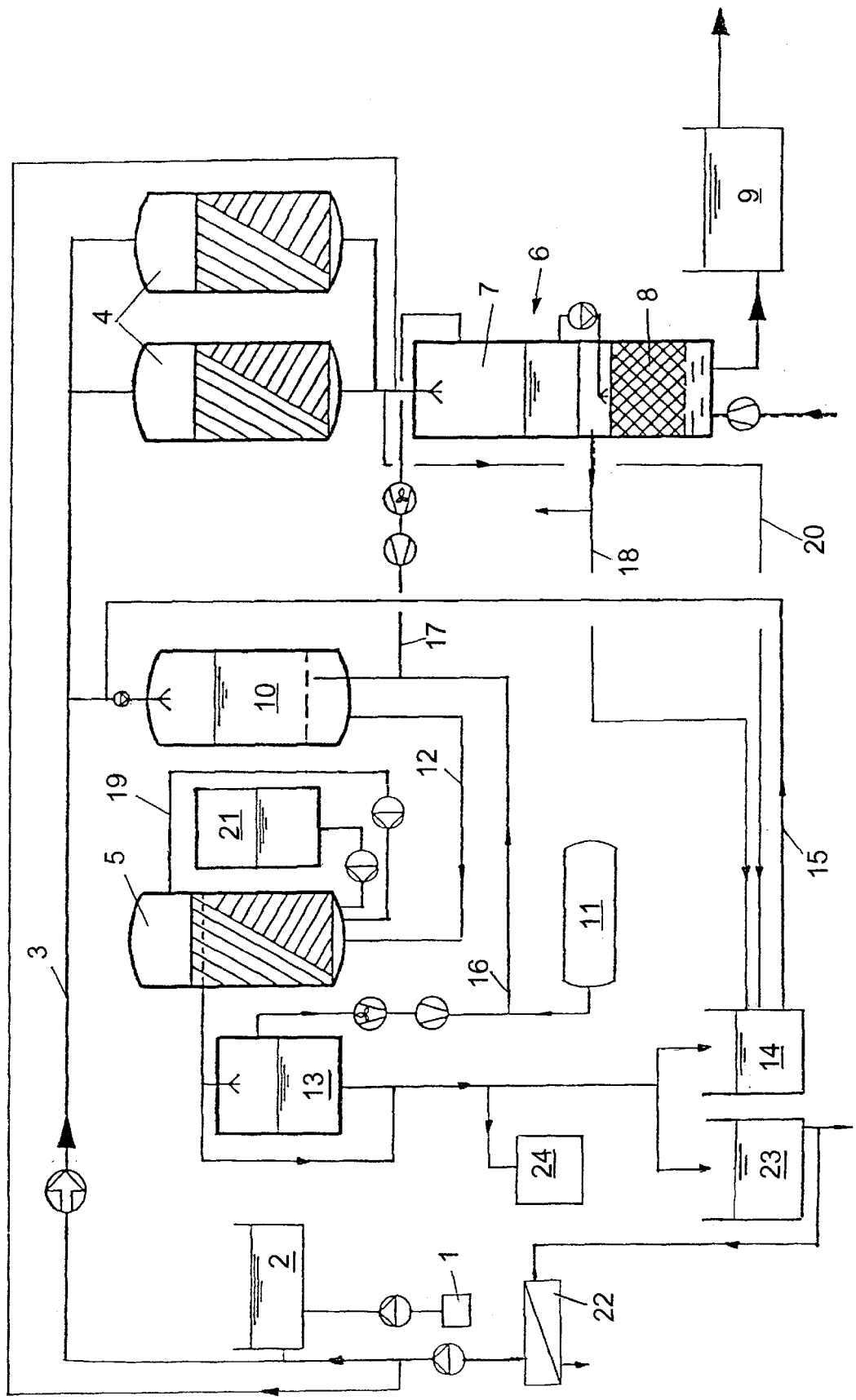

PROCESS FOR THE PARTIAL DESALINATION OF WATER

BACKGROUND OF THE INVENTION

The invention relates to a water desalination process.

A similar process is known from the EP-PS 56 850 and from "Vom Wasser 69 (1987), pages 259–267". This process is used for the partial desalination of water in particular during water purification. Because of the use of a mixture of basic and acidic ion-exchangers, and the regeneration of the consumed ion-exchangers with the help of $CO_2$ containing water, this known process is distinguished in that no excess regenerating chemicals need be used and that an additional salination of the regenerating water can be avoided.

SUMMARY OF THE INVENTION

It is now an object of the invention to extend the invention so that further compounds present in the starting water can be reduced and that the employed chemicals are used more efficiently.

It is the goal of the invention to also reduce the content of organically bound carbon (TOC and DOC value) with the ion-exchanger mixture in the process of the art. The intermittent regeneration with Cl containing chemicals removes the accumulated carbon from the ion-exchangers which cannot be removed with $CO_2$. The immediate reuse of the flushing water, the reuse of the pre-filtrate, and of the $CO_2$, as well as the subsequent treatment of the used regenerating water improve in connection with the additional reduction of the organic carbon the utilization of the input chemicals and operating chemicals and thereby contribute to the economic efficiency of the process. A further reduction of the organic content is achieved with the addition of pulverized activated charcoal, which can be removed again during the subsequent regeneration.

BRIEF DESCRIPTION OF THE DRAWINGS

The invention is explained in more detail by way of an example and the drawing. The drawing shows a process schematic for the partial desalination of water.

DESCRIPTION OF THE PREFERRED EMBODIMENTS

Starting water is removed from a well 1, and either used directly or pumped into a starting water reservoir 2. The water to be treated is removed from the starting water reservoir 2 and conveyed to a filtration arrangement consisting of multiple filters 4,5 by way of a starting water pipe 3. In the shown example, the two filters 4 shown in the right half of the drawing are in use, while the filters shown on the left is being regenerated. The filters 4, 5 are filled with a mixture of weakly acidic cation exchangers and strongly basic anion exchangers. The mixing ratio of cation to anion exchangers is 15:1 to 1:15. In the filters 4, 5, a part of the salt content of the starting water is removed by contact with the ion-exchangers. The partially desalinated purified water enters a two stage purified water degasser 6 for the adjustment of the lime-carbonic acid-equilibrium. In the first stage, a vaccum degasser 7, $CO_2$ is removed from the purified water by applying a vacuum. Subsequently, the purified water is guided to the second step, a trickle degasser 8 into which air is pumped. The degassed purified water is supplied to the consumer directly or by way of a purified water reservoir 9. The vacuum degasser step 7 can also be omitted.

The charged ion exchangers are regenerated with $CO_2$ containing water. This regeneration water is prepared in a regenerating water reservoir 10, into which water is fed from above from the starting water conduit 3 or from the purified water reservoir 9 and into which $CO_2$ is fed from below from a $CO_2$ tank 11 and from the returns of the vacuum degasser 7 and the eluate degasser 13 described further below. The regeneration water is fed through a conduit 12 and from below into the filter 5 to be regenerated, which means against the desalination direction. After passage through the filter 5, the eluate produced during the regeneration is fed into an eluate degasser 13 run by vacuum, wherein $CO_2$ is expelled from the elutate. The degassed eluate is either directly fed to a surface water reservoir 24 or temporarily stored in an eluate reservoir 23 from which it is released into surface water in an equalized manner. Part of the eluate can be fed to the reaction reservoir 10 through an eluate conduit 15 and from a further intermediate storage 14, where it can be used for the regeneration.

The $CO_2$ expelled from the eluate in the eluate degasser 13 is collected and fed to the reaction reservoir 10 through a conduit 16. The $CO_2$ generated in the vacuum degasser step 7 of the purified water degasser 6 is fed in the same manner back to the reaction reservoir 10 through a conduit 17. The $CO_2$ released in the trickle degasser 8 is either fed through a conduit 18 into the eluate/rinsing water/pre-filtrate stored in the intermediate reservoir 14, whereby a further loading of this water with $CO_2$ is achieved, or directly released to the environment.

After each regeneration phase the regenerated filter 5 is rinsed with flushing water in order to clear the ion exchangers from the residues of the regenerating water. The flushing water is drawn from the starting water. After exiting from the filter 4,5, the spent flushing water is fed back into the intermediate reservoir 14 and retained for the next regeneration.

The pre-filtrate which initially exits a regenerated filter 4, 5 is not released as purified water. Instead, this pre-filtrate is also fed into the intermediate reservoir 14 through a pre-filtrate conduit 20 and used for the subsequent regeneration. A separate $CO_2$ circuit serves the disaggregation of the ion exchanger material.

The total organic carbon present in the starting water and the carbon dissolved in the water (TOC value and DOC value) are reduced by the employed ion-exchanger mixture in the starting water during passage through the filters. This carbon accumulates on the ion exchangers. In addition to the above described regeneration of the filters 4, 5 with $CO_2$-containing water, the filters are intermittently regenerated with a regenerating solution. The regenerating solution consists of HCl, NaCl, NaOH, or of a mixture of NaOH and NaCl. This regenerating solution is kept available in a storage container 21 and at different times, which are dependent on the loading condition is pressed through the filters 4 and 5. The spent regenerating solution is disposed of.

The eluate contains the salt load which has been withdrawn form the starting water. To increase the yield, the eluate can be fed completely or partly to a membrane filter unit 22. The membrane filter unit 22 operates according to a process of reverse osmosis, nano-filtration or electro-dialysis. The permeate obtained in the membrane filter unit 22 is either fed to the starting water reservoir 2 or admixed with the starting water to be treated in the filter installation or to the purified water after drainage of the filters 4,5. The salt containing filtrate or concentrate is fed to the surface water reservoir 24 or to a waste water treatment plant.

In accordance with the present invention, pulverized activated charcoal may be added to the starting water upstream of the ion exchangers. The pulverized charcoal is retained by the ion exchangers, and again released to the eluate during the next regeneration.

Also, at least one of the compounds of $CaCO_3$, $CaCO_3$ combined with MgO, or $Ca(OH)_2$ may be added to the $CO_2$-containing water.

What is claimed is:

1. A process for the partial desalination of drinking water using ion exchangers with subsequent regeneration of the ion exchangers; said drinking water containing inorganic salts and organic carbon compounds, said process comprising the steps of: contacting said drinking water with ion exchangers comprising a mixture of weakly acidic cation exchangers and strongly basic anion exchangers in filters such that the content of said salts and said organic carbon compounds is simultaneously reduced by said ion exchanger, thereby producing charged ion exchangers and purified water; regenerating the charged ion exchangers with $CO_2$-containing water and intermittently regenerating charged ion exchangers with a solution containing the compounds HCl, NaCl and NaOH whereby producing regenerated ion exchangers; flushing the regenerated ion exchangers with flushing water; and repeating the preceding steps of the process.

2. A process as defined in claim 1, wherein said flushing water is directly fed into an intermediate storage to be stored in said storage after contact with said ion exchangers.

3. A process as defined in claim 1, wherein a portion of purified water leaving the filers containing said ion exchangers is fed into an intermediate storage.

4. A process as defined in claim 1, wherein an eluate is generated during said regeneration of said ion exchangers and is treated by a membrane filter unit to generate a permeate and a concentrate; returning the permeate to the drinking water to be desalted; and feeding the concentrate to a surface water reservoir.

5. A process as defined in claim 1, wherein purified water is degassed and $CO_2$ is thereby liberated; feeding said liberated $CO_2$ to said $CO_2$-containing water used to regenerate charged ion exchangers.

6. A process as defined in claim 1, wherein an eluate is generated during said regenerating of said ion exchangers; degassing said eluate by a vacuum degasser and liberating thereby $CO_2$; feeding said liberated $CO_2$ to said $CO_2$-containing water for regenerating charged ion exchangers.

7. A process as defined in claim 1, including the step of adding pulverized charcoal to the drinking water to be desalted upstream of the filters containing the ion exchanges; retaining said charcoal by the ion exchangers; removing said charcoal from the ion exchangers by said $CO_2$-containing water during the subsequent step of regeneration of the ion exchangers.

8. A process as defined in claim 1, wherein the ratio of weakly acid cation exchangers to strongly basic anion exchangers in the mixture is in the range from 15:1 to 1:15.

9. A process as defined in claim 1, including the step of adding at least one of the compounds of $CaCO_3$, $CaCO_3$ combined with MgO, or $Ca(OH)_2$ to said $CO_2$-containing water in the step of regenerating the charged ion exchangers.

* * * * *